US008324487B2

(12) United States Patent
Shen et al.

(10) Patent No.: US 8,324,487 B2
(45) Date of Patent: Dec. 4, 2012

(54) DISPERSIBLE CARBON NANOTUBES AND METHOD FOR PREPARING SAME

(76) Inventors: Tongde Shen, Katy, TX (US); Jing Li, Henan Province (CN)

( * ) Notice: Subject to any disclaimer, the term of this patent is extended or adjusted under 35 U.S.C. 154(b) by 239 days.

(21) Appl. No.: 12/792,428

(22) Filed: Jun. 2, 2010

(65) Prior Publication Data
US 2011/0301251 A1 Dec. 8, 2011

(51) Int. Cl.
C09K 5/00 (2006.01)
(52) U.S. Cl. ........ 977/840; 977/742; 977/750; 977/842; 252/71
(58) Field of Classification Search ............... 252/71, 252/182.32; 423/460; 422/186, 186.04; 977/742, 750, 840, 842; 204/157.47
See application file for complete search history.

(56) References Cited

U.S. PATENT DOCUMENTS

| | | | |
|---|---|---|---|
| 6,368,569 B1 | 4/2002 | Haddon et al. | |
| 6,531,513 B2 | 3/2003 | Haddon et al. | |
| 6,783,746 B1 | 8/2004 | Zhang et al. | |
| 6,827,918 B2 | 12/2004 | Margrave et al. | |
| 6,875,412 B2 | 4/2005 | Margrave et al. | |
| 6,878,361 B2 | 4/2005 | Clarke et al. | |
| 7,247,670 B2 | 7/2007 | Malenfant et al. | |
| 7,250,569 B2 | 7/2007 | Sun et al. | |
| 7,365,100 B2 | 4/2008 | Kuper et al. | |
| 7,411,085 B2 | 8/2008 | Hirakata et al. | |
| 7,414,088 B1 | 8/2008 | Ford et al. | |
| 7,459,137 B2 | 12/2008 | Tour et al. | |
| 7,501,108 B2 | 3/2009 | Yerushalmi-Rozen et al. | |
| 7,531,157 B2 | 5/2009 | Ford et al. | |
| 7,588,941 B2 | 9/2009 | Zheng et al. | |
| 2007/0158610 A1* | 7/2007 | Hong et al. | 252/71 |
| 2007/0224106 A1 | 9/2007 | Sakakibara et al. | |
| 2010/0254888 A1* | 10/2010 | Kawakami et al. | 423/460 |

OTHER PUBLICATIONS

Sumio Lijima, Helical Microtubules of Graphitic Carbon, Letters to Nature, (Nov. 7, 1991), vol. 354, pp. 56-58, NEC Corporation, Fundamental Research Laboratories.
Shaoming Huang et al., Growth of Millimeter-Long and Horizontally Aligned Single-Walled Carbon Nanotubes on Flat Substrates, J. Am. Chem. Soc., No. 19, (Feb. 3, 2003), pp. 5636-5637, vol. 12., Chemistry Department, Duke University, Durham, North Carolina.
Cees Dekker, Carbon Nanotubes as Molecular Quantum Wires, Physics Today, (May 1999), pp. 22-28, 1999 American Institute of Physics, S-0031-9228-9905-010-3.
P. Kim et al., Thermal Transport Measurements of Individual Multiwalled Nanotubes, (Jun. 27, 2001), pp. 1-4, University of California, Berkeley, CA 94720, Division of Materials Sciences, Lawrence Berkeley National Laboratory, Berkeley, CA 94720.
Min-Feng Yu et al., Tensile Loading of Ropes of Single Wall Carbon Nanotubes and their Mechanical Properties, Physical Review Letters, (Jun. 12, 2000), pp. 5552-5555, vol. 84, No. 24.

Min-Feng Yu et al., Strength and breaking Mechanism of Multiwalled Carbon Nanotubes Under Tensile Load, www.sciencemag.org, Science, vol. 287, (Jan. 28, 2000), pp. 637-640.
Jie Liu et al., Fullerene Pipes, www.sciencemag.org, Science, (May 22, 1998), vol. 280, pp. 1253-1256.
Stefano Sanvito et al., Fractional Quantum Conductance in Carbon Nanotubes, Physical Review Letters, (Feb. 28, 2000), vol. 84, No. 9, pp. 1974-1977.
Jeffrey L. Bahr et al., Dissolution of Small Diameter Single-wall Carbon Nonotubes in Organic Solvents?, Chem. Commun., (2001), pp. 193-194.
Jin Zhang et al., Effect of Chemical Oxidation on the Structure of Single-Walled Carbon Nanotubes, J. Phys. Chem. B (2003), vol. 107, No. 16, pp. 3712-3718, Center for Nanoscale Science and Technology (CNST), College of Chemistry & Molecular Engineering, Peking University, Beijing 100871, P.R. China, and Laboratory of Lubrication and Functional Materials, Henan University, Kaifeng 475001, P.R. China.
Sarbajit Banerjee et al., Rantional Sidewall Functionalization and Purification of Single-Walled Carbon Nanotubes by Solution-Phase Ozonolysis, J. Chem B. vol. 106, No. 47, (2002), Department of Chemistry, State University of New York, Stony Brook, New York, and Materials and Chemical Sciences Department, Brookhaven National Laboratory, Upton, New York.
Xiao Qu et al., Dispersion of Carbon Nanotubes in Aqueous Solution with Cationic Surfactant CTAB, Journal of Inorganical Materials, vol. 22, No. 6, (Nov. 2007), pp. 1122-1126, (Department of Inorganical Materials, School of mineral processing and Bioengineering, Central South University, Changsha 4100083, China).
Junrong Yu et al., Controlling the Dispersion of Multi-Wall Carbon Nanotubes in Aqueous Surfactant Solution, Carbon 45 (2007) pp. 618-623. Available online at www.sciencedirect.com.
J. I. Paredes et al., Dispersions of Individual Single-Walled Carbon Nanotubes of High Length, Langmuir (2004), 20, pp. 5149-5152.
Tawfique Hasan et al., Stabilization and "Debundling" of Single-Wall Carbon Nanotube Dispersions in N-Methyl-2-pyrrolidone (NMP) by Polyvinylpyrrolidone (PVP), J. Phys. Chem. C (2007), 111, pp. 12594-12602, Engineering Department, Cambridge University.
Jun Qiu et al., Preparation and Characterization of Amphiphilic Multi-Walled Carbon Nanotubes, J. Nanoport Res (2008) 10:659-663.

(Continued)

Primary Examiner — Ling Choi
Assistant Examiner — Monique Peets
(74) Attorney, Agent, or Firm — Wong, Cabello, Lutsch, Rutherford & Brucculeri, L.L.P.

(57) ABSTRACT

Dispersible single-walled and multi-walled carbon nanotubes (CNTs) are prepared by dissolving surfactants in water to form a solution; adding carbon nanotubes to the solution to form a mixture; sonicating and agitating the mixture to form a carbon-nanotube/water dispersion; centrifuging the dispersion to remove un-dispersed carbon nanotubes and impurities; repeatedly freezing and heating the CNT dispersion; and, sublimating water in the CNT dispersion by freezing and evacuating the dispersion to obtain carbon nanotubes coated with surfactant. The carbon nanotubes prepared by the method of the invention are dry, amphiphilic, and surfactant-coated powders that can be dispersed in both aqueous and organic solvents to form stable and uniform dispersions having a high concentration of carbon nanotubes.

20 Claims, No Drawings

OTHER PUBLICATIONS

Jing Kong et al., Chemical Vapor Desposition of Methane for Single-Walled Carbon Nanotubes, Chemical Physics Letters 292 (1998) pp. 567-574.

Jing Kong et al., Synthesis of Individuals Single-Walled Carbon Nanotubes on Patterned Silicon Wafers, Nature, vol. 395, (Oct. 29, 1998), www.nature.com.

Alan M. Cassell et al., Large Scale CVD Synthesis of Single-Walled Carbon Nanotubes, J. Phys. Chem B (1999), 103, pp. 6484-6492.

Hongjie Dai et al., Controlled Chemical Routes to Nanotube Architectures, Physics, and Devices, J. Phys., Chem B. (1999), 103, pp. 11246-11255.

J. Journet et al., Large-Scale Production of Single-Walled Carbon Nanotubes by the Electric-Arc Technique, Nature, vol. 388, (Aug. 21, 1997).

Andreas Thess et al., Crystalline Ropes of Metallic Carbon Nanotubes, Science, vol. 273, No. 5274, (Jul. 26, 1996), pp. 483-487. Published by: American Association for the Advancement of Science.

Pavel Nikolaev et al., Gas-phase Catalytic Growth of Single-Walled Carbon Nanotubes From Carbon Monoxide, Chemical Physics Letters 313, (1999), pp. 91-97.

* cited by examiner

DISPERSIBLE CARBON NANOTUBES AND METHOD FOR PREPARING SAME

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to the preparation of surfactant-coated, single-walled and multi-walled carbon nanotubes. More particularly, it relates to the preparation of single-walled and multi-walled carbon nanotubes that are dispersible in aqueous and organic solvents to form stable and uniform dispersions.

2. Description of the Related Art Including Information Disclosed Under 37 CFR 1.97 and 1.98.

Carbon nanotubes (CNTs) were discovered in 1991 by S. Iijima (S. Iijima, Nature 354 (1991) 56). They are nanometer-size cylinders comprised of carbon atoms. CNTs can be classified into single-walled carbon nanotubes (SWCNTs) and multi-walled carbon nanotubes (MWCNTs). A single-walled carbon nanotube can be thought of as a sheet of graphite (a hexagonal lattice of carbon atoms) rolled into a cylinder. Typical diameters of SWCNTs are in the range of 0.7-1.4 nm and their length can range from a few tens of nanometers to several micrometers (S. Huang et al., J. Am. Chem. Soc. 125 (2003) 5636), making them one of the highest aspect-ratio objects known. Multi-walled carbon nanotubes can be regarded as a coaxial assembly of SWCNTs. The separation between adjacent tubes is close to the separation found between layers in graphite. Typical diameters of MWCNTs are in the range of 5-50 nm.

Depending on their diameter, length, and chirality, CNTs may exhibit unique optical, electrical, thermal, and mechanical properties. CNTs can behave as semiconductors or as metals (C. Dekker, Physics Today 52 (1999) 22) and their Young's modulus is ~1.2 TPa, 5 times that of steel, which makes them one of the strongest known objects in nature. CNTs have high thermal conductivity, over 3000 W/m K at room temperature (P. Kim et al., Phys. Rev. Lett. 8721 (2001) 215502). The breaking strength of SWCNTs and MWCNTs can reach 52 and 63 GPa respectively, approximately 30 times that of high-strength steel (M. F. Yu et al., Phys. Rev. Lett. 84 (2000) 5552; M. F. Yu et al., Science 287 (2000) 637). The high aspect ratio (length/diameter) and unique properties of CNTs make them highly desirable for composite materials with significantly improved electrical conductivity, thermal conductivity, mechanical strength, and photonic properties.

However, the advantageous properties of CNTs are often unrealized in composite materials on a macroscopic level for several reasons. The first reason is a tendency of CNTs to crystallize in rope-like structures which become entangled into networks. Strong Van-der-Waals interactions between two CNTs lead to their alignment and to their consequent packing into ropes which may contain 100 to 500 tubes (J. Liu et al., Science 280 (1998) 1253). This aggregation of CNTs affects (often adversely) both their electrical and mechanical behavior (S. Sanvito et al., Phys. Rev. Lett. 84 (2000) 1974). The second reason is the insolubility or poor dispersion of CNTs in common organic solvents and polymer matrixes. The solubility of SWCNTs in common organic solvents is often less than 0.1 mg/ml (J. L. Bahr et al., Chem. Commun. 2 (2001) 193). In many cases, CNTs are heterogeneously dispersed in matrix materials (e.g., polymers), leading to physical (instead of chemical) interactions between the CNTs and the matrix materials.

In order to address these problems, researchers have developed many methods for preparing uniform and stable CNT dispersions. Surface functionalization and the addition of surfactants are perhaps the most frequently used methods. Surface functionalization introduces chemical functional groups onto the surface of CNTs whereas surfactants are usually added to solvents in which CNTs are to be dispersed. Different chemicals and methods have been used for the surface functionalization of CNTs (see, e.g., U.S. Pat. Nos. 6,368,569 and 6,531,513 to Haddon et al.; U.S. Pat. Nos. 6,827,918 and 6,875,412 Margrave et al.; U.S. Pat. No. 7,247,670 to Malenfant et al.; U.S. Pat. No. 7,250,569 to Sun et al.; U.S. Pat. No. 7,411,085 to Hirakata et al.; U.S. Pat. No. 7,414,088 to Ford et al.; U.S. Pat. No. 7,459,137 to Tour et al.; U.S. Pat. No. 7, 531,157 to Ford et al.; J. Zhang et al., J. Phys. Chem. B 107 (2003) 3712; and, S. Banerjee et al., J. Phys. Chem. B 106 (2002) 12144). The concentrations of these surface-functionalized CNTs in solvents (usually organic) are either low (typically less than 5 mg/ml) or unspecified. Adding surfactants in solvents may also improve the dispersibility of CNTs (see, e.g., U.S. Pat. No. 6,783,746 to Z. Zhang et al.; U.S. Pat. No. 6,878,361 to Clarke et al.; U.S. Pat. No. 7,365,100 to Kuper et al.; U.S. Pat. No. 7,588,941 to Zheng et al.; Q. Xiao et al., J. Inorg. Mater., 22 (2007) 1122; J. R. Yu et al., Carbon 45 (2007) 618; J. I. Paredes et al., Langmuir 20 (2004) 5149). However, CNTs are usually dispersed in aqueous solvents.

In particular, as-prepared liquid dispersions are only stable for a limited time. For example, polyvinylpyrrolidone (PVP)-stabilized SWCNT/N-Methyl-2-pyrrolidone (NMP) dispersions are only stable for about three weeks (T. Hasan et al., J. Phys. Chem. C 111 (2007) 12594). Although the stable time of SWCNT/NMP dispersions can be increased to approximately four weeks, the concentration of SWCNTs in NMP solvents must be less than about 0.05 wt % (Y. Sakakibara et al., U. S. Patent Pub. No. 2007/0224106 A1). For many applications, a dispersion with a high concentration of carbon nanotubes may be required since this decreases the cost, facilitates processing, and lowers the usage of solvents that may not be environmentally friendly.

Thus, it is desirable to make dry, dispersible CNT powders. Dry CNT powders can be re-dispersed in solvents to form CNT dispersions for immediate use. In addition, it is easy to store, transport, and manipulate the dry CNT powders. Qiu et al. (J. Qiu et al., J. Nanopart. Res. 10 (2008) 659) have made dry N-vinylpyrrilidone (NVP)-coated MWCNT powders that are both hydrophilic and lipophilic. The content of these MWNTs in water, alcohol, and dimethylformamide (DMF) is only 0.40, 0.33, and 0.34 mg/ml, respectively, or, when expressed as a weight percentage, 0.040%, 0.042%, and 0.036%, respectively. U.S. Pat. No. 7,501,108 to Yerushalmi-Rozen et al. describes the use of gum arabic (GA) as a surfactant to coat SWNCTs. The as-coated SWCNTs, however, can only be re-dispersed in water, rather than in organic solvents, to form stable dispersions.

None of the conventional methods provides a process for making dispersible CNTs as described and claimed in the instant invention as follows.

BRIEF SUMMARY OF THE INVENTION

In this invention, physical and chemical treatments are combined to provide a method of obtaining dry CNT powders that are dispersible in both aqueous and organic solvents. The present invention overcomes the above-described limitations and disadvantages of the prior art by providing a method of preparing CNTs that has the following four advantages:
1) CNTs are in the form of dry powders that can be dispersed in solvents to form stable and uniform dispersions;
2) CNTs may be in the form of SWCNTs and/or MWCNTs;
3) CNTs may be both hydrophilic and lipophilic and can thus be dispersed in both aqueous and organic solvents to form stable dispersions;
4) CNTs may be dispersed in solvents to form stable dispersions with a high CNT content, one to two orders of magnitude higher than the CNT content typically achieved by the methods of the prior art.

The known prior art does not provide a method of preparing CNTs that exhibits all of the above advantages, which are important to practical applications.

The method of the present invention comprises dispersing CNTs in water containing dissolved surfactants and drying the CNT/water dispersions to coat surfactants on the surface of CNTs.

The dispersing step may be further described as follows: surfactants —PVP (polyvinylpyrrolidone), OP-10 (polyethylene glycol alkylphenyl ether), and TWEEN® 20 (polyethylene glycol sorbitan monolaurate)—are dissolved in water to form solutions; CNTs are added to the above solutions; CNT dispersions are then made by sonication, followed by agitation and centrifugation.

The drying step may be further described as follows: after the CNTs and impurities that are not dispersed in the water are separated by centrifugation and removed, stable and uniform CNT dispersions, located in the top layer of the centrifuged dispersions, are frozen in liquid nitrogen and subsequently sublimated to remove water.

After the above dispersing and drying steps, surfactant-coated dry CNTs powders are obtained that may be re-dispersed in aqueous and organic solvents such as water, ethanol, NMP (N-Methyl-2-pyrrolidone), and DMF (dimethylformamide).

DETAILED DESCRIPTION OF THE INVENTION

The invention relates to a method comprising dispersing CNTs in water using PVP, OP-10, and TWEEN 20 as surfactants and drying the CNT/water dispersions to obtain surfactant-coated CNT powders that can be re-dispersed in both aqueous and organic solvents. The method is applicable to both SWCNTs and MWCNTs. The method overcomes two major obstacles to the practical application of CNTs: 1) CNTs have a strong tendency to aggregate in bundles and clusters. In addition, their solubility in most organic solvents is negligible. The method can be used to effectively disperse CNTs in many aqueous and organic solvents with a content of CNTs that may be two orders of magnitude higher than the content of CNTs typically achieved in prior art. 2) CNT dispersions are only stable for a limited time. Dry CNT powders prepared by the method of the invention can be re-dispersed in solvents to form CNT dispersions for immediate use. In addition, it is easy to store, transport, and manipulate dry CNT powders.

The method of preparing dispersible CNTs comprises two steps: a dispersing step, followed by a drying step. In the dispersing step, surfactants (PVP, OP-10, and TWEEN 20) are dissolved in water to form solutions, CNTs are added into the solutions, which are then treated by sonication and agitation. After these sonication and agitation treatments, most of the CNTs are dispersed in water to form a CNT/water dispersion. Centrifugation may be used to separate any non-dispersed CNTs and impurities from the stable and uniform CNT/water dispersion. In the drying step, the stable CNT/water dispersions obtained in the dispersing step are first subjected to a cyclic freezing/heating treatment and are then sublimated. After these treatments, water may be removed from the dispersions whereby surfactant-coated CNT powders are obtained. These surfactant-coated CNT powders can easily be re-dispersed in aqueous and organic solvents by an ultrasonic treatment in a conventional ultrasonic cleaner.

Carbon nanotubes (CNTs) used in this invention include both single-walled carbon nanotubes (SWCNTs) and multi-walled carbon nanotubes (MWCNTs). SWCNTs and MWCNTs are commercially available from Nanostructured & Amorphous Materials, Inc. of Houston, Tex. (www.nanoamor.com). Purity and diameter of commercially-available SWCNTs are approximately 90% by volume and 1 to 2 nm, respectively. The MWCNTs come in three forms that are classified by their diameter D and length L: D=8-15 nm, L=10-50 um; D=20-40 nm, L=5-30 um; and D=50-100 nm, L=5-10 um. Purity of all the MWCNTs is greater than 95% by weight. The method provided in the present invention may also be applicable to SWCNTs and MWCNTs with purities, diameters, and lengths different than those specified above.

The CNTs used in the examples reported herein were produced by a chemical vapor deposition (CVD) method (J. Kong et al., *Chem. Phys. Lett.* 292 (1998) 567; J. Kong et al., *Nature* 395 (1998) 878; A. M. Cassell et al., *J. Phys. Chem.* 103 (1999) 6484; H. J. Dai et al., *J. Phys. Chem.* 103 (1999) 11246). However, the method of the present invention may be also applicable to CNTs produced by other methods such as arc discharge (C. Journet et al., *Nature* 388 (1997) 756), laser vaporization of graphite (A. Thess et al., *Science* 273 (1996) 483), and the HiPCO (high pressure carbon monoxide) process (P. Nikolaev et al., *Chem. Phys. Lett.* 313 (1999) 91).

Surfactants are chemical compounds that lower the surface tension of a liquid, allowing easier spreading, and lowering the interfacial tension between two liquids. The surfactants used in the examples described below were PVP (polyvinylpyrrolidone), OP-10 (polyethylene glycol alkylphenyl ether), and TWEEN 20 (polyethylene glycol sorbitan monolaurate). PVP (Polyvinylpyrrolidone) is a polymer made from the monomer N-vinylpyrrolidone and soluble in water and other polar solvents. Both OP-10 and TWEEN 20 are non-ionic surfactants, i.e., they do not produce ions in aqueous solution.

The surfactants were dissolved in water to form solutions. The content of PVP was 0.05-10 wt % whereas that of non-ionic surfactants (OP-10 and TWEEN 20) was 0.05-5 wt %. The molecular weight (MW) of the PVP was between 8000 and 1,300,000. It has been found that if the MW of PVP is too low, the surface of CNTs cannot be effectively coated by the PVP. If the MW of the PVP is too high, the viscosity of the surfactant(s)/water solution will be so high that the PVP cannot be effectively coated onto the surface of CNTs.

Sonication is the act of applying sound (usually ultrasound) energy to agitate particles in a sample, for various purposes. In the laboratory, it is usually applied using an ultrasonic bath or an ultrasonic probe, colloquially known as a sonicator. The sonication treatment used in the present invention may be carried out on a sonicator equipped with an ultrasonic probe, operated at a frequency of 20-25 kHz, and supplied by Ningbo Scientz Bio-Tech Co., Ltd.

The agitation treatment may be performed on a conventional magnetic stirrer. A magnetic stirrer is a laboratory device consisting of either a rotating magnet or stationary electromagnets creating a rotating magnetic field. This device is used to cause a stir bar immersed in a liquid to spin very quickly, agitating or mixing the liquid. The magnetic stirrer used in the examples also had a provision for heating the liquid.

The centrifugation treatment may be done on a conventional centrifuge operated at a speed of about 3000 rpm. A centrifuge is a piece of equipment, generally driven by an electric motor, that puts an object in rotation around a fixed axis, thereby applying a force perpendicular to the axis. The centrifuge works using the sedimentation principle, wherein the centripetal acceleration causes heavier particles to move out along the radial direction (the bottom of the tube containing liquid(s)). By the same token, lighter objects will tend to move to the top of the tube. The centrifugation treatment employed in the examples described herein separated stable CNT/water dispersions located at the top of the tube from CNTs and impurities that were not dispersed in water and located at the bottom of the tube.

A conventional low-energy ($\leqq 200$ watts) ultrasonic cleaner operated at a frequency of 40 kHz was used to re-disperse the surfactant-coated CNTs in aqueous and organic solvents. An ultrasonic cleaner is a cleaning device that uses ultrasound and an appropriate cleaning solution to clean delicate items. The ultrasound may be not effective without the cleaning solution. Although the low-energy ultrasonic cleaner is usually used to clean items in laboratories, we have found that it may be powerful enough to effectively re-disperse surfactant-coated CNTs in solvents.

Solvents in which the dry, surfactant-coated CNT powders of the invention can be re-dispersed include, but are not limited to, water, acetic acid, 1,4-butanediol, butanol, butylamine, chloroform, cyclohexanol, diethylene glycol, dimethyl acetamide, dimethylformamide, dimethyl sulfoxide, ethanol, ethylene diamine, ethylene glycol, formic acid, glycerin, isopropanol, methanol, methylene chloride, methylcyclohexanone, N-methylpyrrolidone, polyethylene glycol 400, propanol, propylene glycol, pyrrolidone, triethanolamine, vinylpyrrolidone, and mixtures thereof.

EXAMPLE 1

Surfactants including PVP, OP-10, and TWEEN 20 were dissolved in 100 ml deionized water to form solutions having the following concentrations:
1) 0.2 wt % PVP (MW=360,000) and 0.1 wt % OP-10
2) 0.2 wt % PVP (MW=360,000) and 0.1 wt % TWEEN 20
3) 0.2 wt % PVP (MW=720,000)
4) 1 wt % PVP (MW=15,000)
5) 1 wt % PVP (MW=15,000) and 0.1 wt % OP-10
6) 1 wt % PVP (MW=40,000)
7) 1 wt % PVP (MW=40,000) and 0.1 wt % OP-10
8) 1 wt % PVP (MW=360,000) and 0.1 wt % OP-10
9) 1 wt % PVP (MW=360,000) and 0.1 wt % TWEEN 20
10) 1 wt % PVP (MW=720,000)

SWCNTs or MWCNTs (0.1 gram) were added to the above solutions, which were then treated by sonication at a power of 200 watts and a frequency of 20-25 kHz for ½ hour to 4 hours, followed by agitation at 50° C. for 4 to 16 hours. After these sonication and agitation treatments, CNTs were dispersed in water to form CNTs/water dispersions. Centrifugation performed in a centrifuge operated at 3000 rpm for 5 minutes was then used to separate the non-dispersed CNTs and impurities from the stable and uniform CNTs/water dispersions. These CNTs/water dispersions remained stable for three to six months. The relative performance of the surfactants employed may be ranked based on the resulting content of non-dispersed CNTs and impurities (with lower content being better) and the stability of the CNTs/water dispersions (with greater stability being better). In this context, stability is defined as the length of time the CNTs remain dispersed in the solvents, i.e., the length of time the CNTs do not separate from the solvents.

Using the above criteria, the performance of the surfactant solutions may be ranked as follows:
Solution 7 (best)
Solution 6
Solution 5
Solution 4
Solution 8
Solution 9
Solution 10
Solution 1
Solution 2
Solution 3 (worst)

EXAMPLE 2

The stable CNT/water dispersions, prepared as described in Example 1, were cyclically frozen and heated. In this cyclic treatment, the dispersions were frozen in liquid nitrogen and then heated in a water bath to a temperature of 50-60° C. This freezing/heating step was repeated three or four times. The dispersions were then frozen in liquid nitrogen and placed in a chamber in a dryer. The chamber was rapidly cooled to a temperature of −40° C., evacuated to a pressure less than 10 Pa, and maintained under these conditions for 12 to 24 hours. After these drying treatments, the water had substantially sublimated and dry, surfactant-coated CNT powders were obtained.

EXAMPLE 3

The dry CNT powders, prepared as described in Example 2, were re-dispersed in water, ethanol, DMF, and NMP using an ultrasonic cleaner. This step was performed by simply adding the dry CNT powders to a solvent contained in a beaker, which was then placed in an ultrasonic cleaner operated at a power of 100 watts and a frequency of 40 kHz for 5 to 20 minutes. Dispersions obtained by re-dispersing the dry, surfactant-coated CNT powders were stable for one to thirty days. For the SWCNT dispersions, content of the SWCNTs was 170-213, 140-175, 150-188, and 155-194 mg/ml in water, ethanol, DMF, and NMP, respectively. For the MWCNT dispersions, content of the MWCNTs was 68-106, 56-87, 60-93, and 62-96 mg/ml in water, ethanol, DMF, and NMP, respectively.

Although the invention has been described in detail with reference to certain preferred embodiments, variations and modifications exist within the scope and spirit of the invention as described and defined in the following claims.

What is claimed is:

1. A method for producing surfactant-treated carbon nanotubes comprising:
dissolving a surfactant in an aqueous solvent to produce a solution;
adding carbon nanotubes to the solution to produce a mixture;
agitating the mixture to produce an aqueous dispersion of carbon nanotubes;
freezing the aqueous dispersion;
thawing the frozen aqueous dispersion;
removing water from the aqueous dispersion to produce powdered, surfactant-treated carbon nanotubes.

2. A method as recited in claim 1 further comprising removing un-dispersed carbon nanotubes from the aqueous dispersion.

3. A method as recited in claim 2 wherein removing un-dispersed carbon nanotubes from the aqueous dispersion comprises centrifuging the aqueous dispersion.

4. A method as recited in claim 1 wherein agitating the mixture comprises sonicating the aqueous dispersion.

5. A method as recited in claim 4 wherein the sonicating is performed at a power level of about 2 kilowatts per liter of aqueous dispersion.

6. A method as recited in claim 1 wherein removing water from the aqueous dispersion comprises sublimating water from the frozen aqueous dispersion.

7. A method as recited in claim 6 wherein the sublimating is performed at sub-ambient pressure.

8. A method as recited in claim 6 wherein the sublimating comprises freezing the dispersion in liquid nitrogen followed by evacuating at a temperature of about −40° C. and a pressure less than 10 Pa for about 12 to about 24 hours.

9. A method as recited in claim 1 further comprising repeatedly freezing and thawing the aqueous dispersion.

10. A method as recited in claim 1 further comprising heating the thawed aqueous dispersion.

11. A method as recited in claim 10 wherein the heating elevates the temperature of the aqueous dispersion to between about 50° C. to about 60° C.

12. A method as recited in claim 1 wherein the surfactant comprises polyvinylpyrrolidone.

13. A method as recited in claim 12 wherein the polyvinylpyrrolidone has a molecular weight between about 8,000 and about 1,300,000.

14. A method as recited in claim 12 wherein the concentration of the polyvinylpyrrolidone in the aqueous solution is between about 0.05 and about 10 weight percent.

15. A method as recited in claim 1 wherein the surfactant comprises polyvinylpyrrolidone and polyethylene glycol alkylphenyl ether.

16. A method as recited in claim 15 wherein the concentration of the polyvinylpyrrolidone in the aqueous solution is between about 0.05 and about 10 weight percent and the concentration of the polyethylene glycol alkylphenyl ether is between about 0.05 and about 5 weight percent.

17. A method as recited in claim 1 wherein the surfactant comprises polyvinylpyrrolidone and polyethylene glycol sorbitan monolaurate.

18. A method as recited in claim 17 wherein the concentration of the polyvinylpyrrolidone in the aqueous solution is between about 0.05 and about 10 weight percent and the concentration of the polyethylene glycol sorbitan monolaurate is between about 0.05 and about 5 weight percent.

19. A method for dispersing carbon nanotubes in a liquid comprising:
dissolving a surfactant in an aqueous solvent to produce a solution;
adding carbon nanotubes to the solution to produce a mixture;
agitating the mixture to produce an aqueous dispersion of carbon nanotubes;
freezing the aqueous dispersion;
thawing the frozen aqueous dispersion;
removing water from the aqueous dispersion to produce powdered, surfactant-treated carbon nanotubes; and,
dispersing the powdered, surfactant-treated carbon nanotubes in a liquid.

20. A method as recited in claim 19 wherein the liquid comprises a solvent selected from the group consisting of: water, acetic acid, 1,4-butanediol, butanol, butylamine, chloroform, cyclohexanol, diethylene glycol, dimethyl acetamide, dimethylformamide, dimethyl sulfoxide, ethanol, ethylene diamine, ethylene glycol, formic acid, glycerin, isopropanol, methanol, methylene chloride, methylcyclohexanone, N-methylpyrrolidone, polyethylene glycol 400, propanol, propylene glycol, pyrrolidone, triethanolamine and vinylpyrrolidone.

* * * * *